United States Patent
Zou et al.

(10) Patent No.: US 12,232,026 B1
(45) Date of Patent: Feb. 18, 2025

(54) COMMUNICATION NETWORK SWITCHING APPARATUS, SYSTEM, AND METHOD

(71) Applicant: DONGGUAN POWER BUREAU OF GUANGDONG POWER GRID CO., LTD., Dongguan (CN)

(72) Inventors: Zhonglu Zou, Dongguan (CN); Jie Wang, Dongguan (CN); Ruhao Wu, Dongguan (CN); Junni Su, Dongguan (CN); Runhua Lu, Dongguan (CN); Zhiming Zhong, Dongguan (CN); Xin Yan, Dongguan (CN); Wei Li, Dongguan (CN); Yongshi Yuan, Dongguan (CN); Zhuxin Zhai, Dongguan (CN); Xiaoqun Chen, Dongguan (CN); Yilin Li, Dongguan (CN); Heping Huang, Dongguan (CN); Zhicai Huang, Dongguan (CN); Hao Xu, Dongguan (CN); Ling Jiang, Dongguan (CN); Qingqi Xian, Dongguan (CN)

(73) Assignee: DONGGUAN POWER BUREAU OF GUANGDONG POWER GRID CO., LTD., Dongguan (CN)

( * ) Notice: Subject to any disclaimer, the term of this patent is extended or adjusted under 35 U.S.C. 154(b) by 0 days.

(21) Appl. No.: 18/825,593

(22) Filed: Sep. 5, 2024

(30) Foreign Application Priority Data

Oct. 10, 2023 (CN) .......................... 202311300862.1

(51) Int. Cl.
*H04W 48/18* (2009.01)
(52) U.S. Cl.
CPC .................................. *H04W 48/18* (2013.01)
(58) Field of Classification Search
CPC ............................. H04W 48/18; H04W 76/00
See application file for complete search history.

(56) References Cited

U.S. PATENT DOCUMENTS

| 2009/0013210 A1 | 1/2009 | McIntosh | |
| 2021/0110068 A1* | 4/2021 | Voss | H04L 12/50 |
| 2024/0027511 A1* | 1/2024 | Cheng | G01R 31/088 |

FOREIGN PATENT DOCUMENTS

| CN | 1688129 A | 10/2005 |
| CN | 101083669 A | 12/2007 |
| CN | 113300885 A | 8/2021 |

OTHER PUBLICATIONS

Office Action issued in Chinese Application No. 202311300862.1, dated Nov. 15, 2023.

* cited by examiner

*Primary Examiner* — Wayne H Cai
(74) *Attorney, Agent, or Firm* — Michael Best & Friedrich LLP

(57) ABSTRACT

Provided are a communication network switching apparatus, a communication network switching system, and a communication network switching method. The apparatus includes a first communication network interface, a second communication network interface, a processor, a communication network switch, and a device access interface. The communication network switch is configured to switch, according to the control signal of the processor, the connection manner with the first communication network interface and the second communication network interface and connect the first communication network or the second communication network to the processor. The processor is connected to the device access interface and is configured to connect a target communication network connected through the communication network switch to a target device connected to the device access interface.

18 Claims, 6 Drawing Sheets

COMMUNICATION NETWORK SWITCHING APPARATUS, SYSTEM, AND METHOD

CROSS-REFERENCE TO RELATED APPLICATION

This application claims priority to Chinese Patent Application No. 202311300862.1, filed on Oct. 10, 2023, the disclosure of which is incorporated herein by reference in its entirety.

TECHNICAL FIELD

The present disclosure relates to the field of communication technology and, in particular, a communication network switching apparatus, a communication network switching system, and a communication network switching method.

BACKGROUND

With the development of communication technology, the distribution network power monitoring system may use multiple communication technologies for network communication. Examples of communication technology are as follows: wired communication using wired media such as optical fiber or copper cable for data transmission, wireless network communication technology suitable for data transmission within the scope of a local area network, mobile network communication technology suitable for data transmission within the scope of a wide area network, optical fiber communication technology for long-distance and high-bandwidth communication requirements, and power-line communication technology using power lines as transmission media for data communication. However, if the selected communication network fails, the distribution network power monitoring system cannot achieve network communication.

In the related art, the communication network connected to a target device is usually switched by an administrator manually plugging and unplugging the network cable. Alternatively, a single communication network may be set only for the target device to meet the communication needs of the target device.

However, the method of manually switching the communication network by the administrator relies too much on the judgment and operation of the administrator, resulting in low reliability and high cost for switching the communication network. Moreover, in the case of setting up a single communication network for communication, the target device cannot achieve network communication when the communication network fails.

SUMMARY

The present disclosure provides a communication network switching apparatus, a communication network switching system, and a communication network switching method. Thus, the switching of a communication network can be achieved, the cost of switching the communication network is reduced, and the reliability and stability of communication are improved.

In a first aspect, an embodiment of the present disclosure provides a communication network switching apparatus. The apparatus includes a first communication network interface, a second communication network interface, a processor, a communication network switch, and a device access interface.

The first communication network interface is connected to a first communication network. The second communication network interface is connected to a second communication network. The first communication network interface and the second communication network interface are separately connected to the processor through the communication network switch.

The communication network switch is configured to switch, according to the control signal of the processor, the connection manner with the first communication network interface and the second communication network interface and connect the first communication network or the second communication network to the processor.

The processor is connected to the device access interface and is configured to connect a target communication network connected through the communication network switch to a target device connected to the device access interface.

Optionally, the apparatus also includes a network isolator. A first end of the network isolator is connected to the device access interface. A second end of the network isolator is connected to the first communication network interface or the second communication network interface. The connection end of the communication network switch and the first communication network interface is used as a first connection end. The connection end of the communication network switch and the second communication network interface is used as a second connection end. Correspondingly, according to a communication network interface connected to the network isolator, a third end of the network isolator is connected to the first connection end or the second connection end. A fourth end of the network isolator is connected to the processor. The network isolator is configured to, in a case where it is determined that the processor is connected to the first communication network or the second communication network, set a communicatively connected state between the first end of the network isolator and the fourth end of the network isolator and between the second end of the network isolator and the third end of the network isolator. The network isolator is also configured to, in a case where it is determined that the processor is not connected to a communication network, set a communicatively connected state between the first end of the network isolator and the second end of the network isolator.

Optionally, the network isolator includes a photovoltaic isolation relay.

Optionally, the communication network switch includes a first Ethernet chip, a second Ethernet chip, and a relay. A first end of the relay is connected to the first communication network interface through the first Ethernet chip. A second end of the relay is connected to the second communication network interface through the second Ethernet chip. A third end of the relay is connected to the processor. The relay is configured to switch the connection manner with the first Ethernet chip and the second Ethernet chip according to the control signal of the processor. The relay is configured to connect the first communication network to the processor through the first communication network interface and the first Ethernet chip or connect the second communication network to the processor through the second communication network interface and the second Ethernet chip.

Optionally, the processor is configured to generate a control signal for communication network switching in a case where it is detected that port traffic information of a target communication network interface corresponding to an accessed target communication network meets a preset traffic monitoring condition.

In a second aspect, an embodiment of the present disclosure also provides a communication network switching system. The system includes the communication network switching apparatus of any embodiment of the present disclosure and a remote control platform. The remote control platform is configured to remotely acquire usage information of a processor for display of the usage information, perform fault detection according to the usage information, and issue a fault alarm according to the fault detection result.

Optionally, the remote control platform is also configured to perform remote service management on the communication network switching apparatus. The remote service management includes a remote online upgrade operation and a remote restarting operation.

Optionally, the system also includes a network security monitoring platform. The network security monitoring platform is configured to perform security monitoring on the first communication network interface, the second communication network interface, and the device access interface of the communication network switching apparatus and, according to the security monitoring result, control the access state of each interface.

In a third aspect, an embodiment of the present disclosure also provides a communication network switching method. The method is applied to the communication network switching system of any embodiment of the present disclosure and includes the steps below.

A connection signal between a target device and a device access interface in a communication network switching apparatus is acquired.

A processor and a communication network switch in the communication network switching apparatus are started in a case where it is determined that the target device is connected to the device access interface according to the connection signal.

The communication network switch connects a first communication network to the processor through a first communication network interface or a second communication network to the processor through a second communication network interface.

Optionally, the method also includes the following: A control signal for communication network switching is generated in a case where it is detected, through the processor, that port traffic information of a target communication network interface corresponding to an accessed target communication network meets a preset traffic monitoring condition. By the communication network switch and according to the control signal, the connection manner with the first communication network interface and the second communication network interface is switched, and the first communication network or the second communication network is connected to the processor. By a network isolator, a disconnected state is set between a first end of the network isolator and a second end of the network isolator in a case where it is determined, by the target device, that the processor is connected to the first communication network or the second communication network. By the network isolator, a communicatively connected state is set between the first end of the network isolator and the second end of the network isolator in a case where it is determined, by the target device, that the processor is not connected to a communication network.

It is to be understood that the contents described in this part are not intended to identify key or important features of embodiments of the present disclosure and are not intended to limit the scope of the present disclosure. Other features of the present disclosure are apparent from the description provided hereinafter.

BRIEF DESCRIPTION OF DRAWINGS

To illustrate technical solutions in embodiments of the present disclosure more clearly, accompanying drawings used in the description of the embodiments are briefly described below. Apparently, the accompanying drawings described below illustrate some embodiments of the present disclosure, and those of ordinary skill in the art may acquire other accompanying drawings based on the accompanying drawings described below on the premise that no creative work is done.

DETAILED DESCRIPTION

The solutions in embodiments of the present disclosure are described clearly and completely in conjunction with drawings in the embodiments of the present disclosure from which the solutions are better understood by those skilled in the art. Apparently, the embodiments described below are part, not all, of the embodiments of the present disclosure. Based on the embodiments described herein, all other embodiments acquired by those skilled in the art on the premise that no creative work is done are within the scope of the present disclosure.

It is to be noted that terms such as "first" and "second" in the description, claims, and drawings of the present disclosure are used to distinguish between similar objects and are not necessarily used to describe a particular order or sequence. It should be understood that the data used in this manner are interchangeable where appropriate so that the embodiments of the present disclosure described herein may also be implemented in a sequence not illustrated or described herein. Additionally, terms "comprising", "including", and any other variations thereof are intended to encompass a non-exclusive inclusion. For example, a process, method, system, product, or device that includes a series of steps or units not only includes the expressly listed steps or units but may also include other steps or units that are not expressly listed or are inherent to such a process, method, product, or device.

EMBODIMENT ONE

Figure 1:
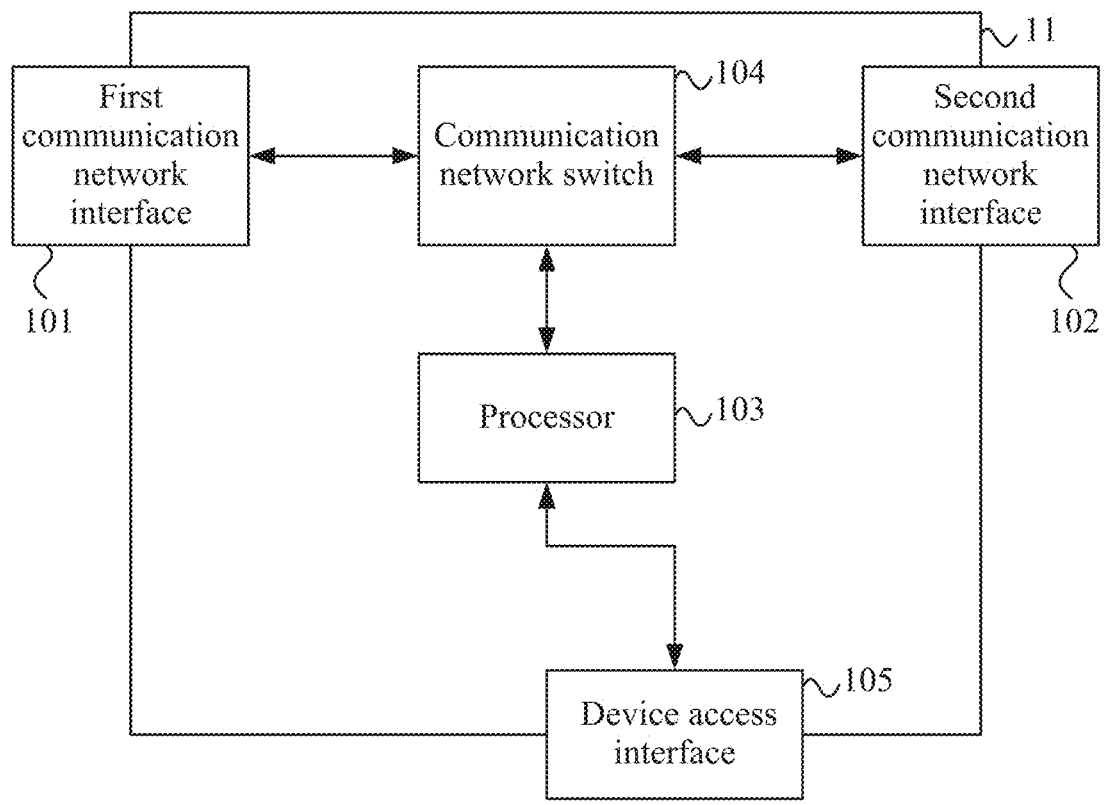
FIG. 1 is a diagram illustrating the structure of a communication network switching apparatus according to embodiment one of the present disclosure.

FIG. 1 is a diagram illustrating the structure of a communication network switching apparatus according to embodiment one of the present disclosure. This embodiment is applicable to the situation where the network is switched in a case where a communication network used by a current target device fails.

As shown in FIG. 1, the communication network switching apparatus 11 disclosed in this embodiment includes a first communication network interface 101, a second communication network interface 102, a processor 103, a communication network switch 104, and a device access interface 105.

The first communication network interface 101 is connected to a first communication network. The second communication network interface 102 is connected to a second communication network. The first communication network interface 101 and the second communication network interface 102 are separately connected to the processor 103 through the communication network switch 104.

In this embodiment, multiple types of the first communication network and the second communication network may be provided, for example, a wired network, a wireless network, and a mobile network. The preceding wired network may include, for example, a fiber optic network and a power-line network. In an embodiment, the preceding first communication network may be the 5th generation mobile networks (5G), the preceding second communication network may be a fiber optic network, and the preceding processor 103 may be a central processing unit (CPU). The target device may be used for data collection, transmission, and monitoring. The target device may be preset according to user needs, for example, a distribution terminal unit (DTU). The target communication network may be the first communication network or the second communication network.

In an embodiment, the communication network switch 104 is configured to switch, according to the control signal of the processor 103, the connection manner with the first communication network interface 101 and the second communication network interface 102 and connect the first communication network or the second communication network to the processor 103; the processor 103 is connected to the device access interface 105 and is configured to connect a target communication network connected through the communication network switch 104 to a target device connected to the device access interface 105.

In a specific embodiment, the connection manner of the first communication network interface 101 and the second communication network interface 102 may be determined according to the control signal of the processor 103. The connection manner may be as follows: The communication network switch 104 is connected to the first communication network interface 101 and is disconnected from the second communication network interface 102. Alternatively, the communication network switch 104 is connected to the second communication network interface 102 and is disconnected from the first communication network interface 101. Then, the target communication network that accesses the processor 103 is determined according to the connection manner of the first communication network interface 101 and the second communication network interface 102 to implement the communication between the target device and a port external device. Optionally, the preceding port external device may be connected to the first communication network and the second communication network.

The advantage of this configuration is as follows: Compared with the communication network switching apparatus in the related art, the communication network switching apparatus provided in this embodiment can completely isolate the first communication network from the second communication network physically, reduce the conflict and interference between the two communication networks, and improve the stability of communication. Secondly, by the configuration of two communication networks, it is possible to switch to the other communication network in a case where one communication network fails, thereby improving the security and reliability of communication.

Figure 2:
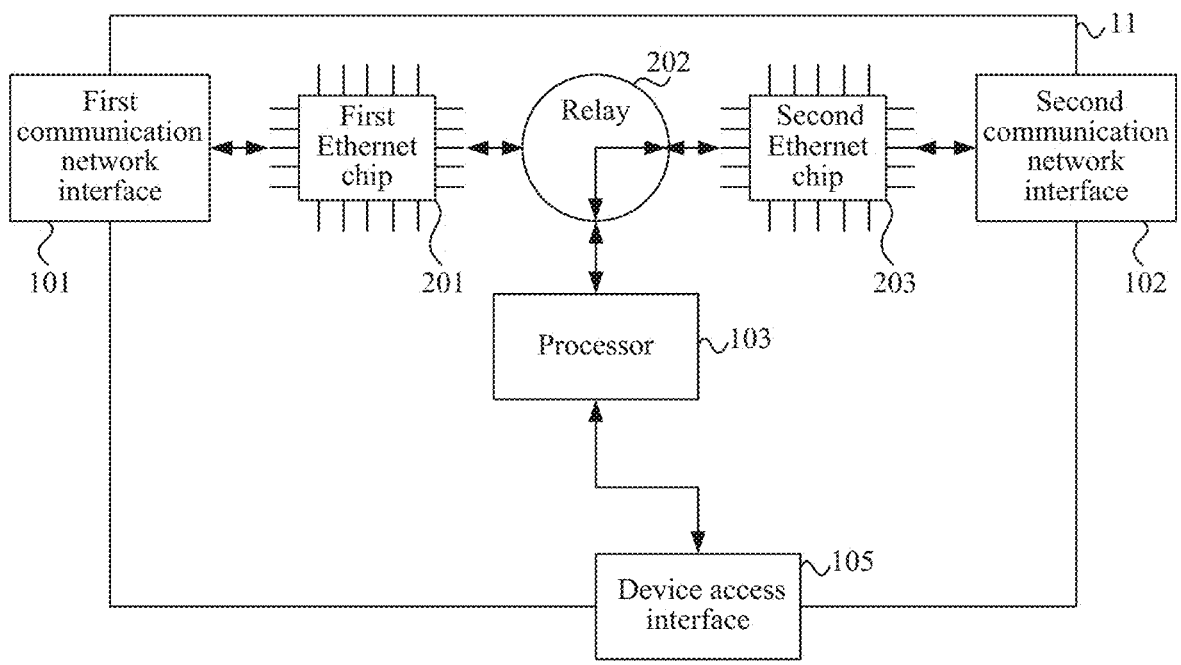
FIG. 2 is another diagram illustrating the structure of a communication network switching apparatus according to embodiment one of the present disclosure.

FIG. 2 is another diagram illustrating the structure of a communication network switching apparatus according to embodiment one of the present disclosure. As shown in FIG. 2, optionally, the communication network switch includes a first Ethernet chip 201, a second Ethernet chip 203, and a relay 202.

A first end of the relay 202 is connected to the first communication network interface 101 through the first Ethernet chip 201; a second end of the relay 202 is connected to the second communication network interface 102 through the second Ethernet chip 203; and a third end of the relay 202 is connected to the processor 103.

In this embodiment, the first Ethernet chip 201 and the second Ethernet chip 203 are configured to implement the communication between the target device and the port external device. Optionally, the relay 202 may be a pin-controlled relay.

In an embodiment, the relay 202 is configured to switch the connection manner with the first Ethernet chip 201 and the second Ethernet chip 203 according to the control signal of the processor 103; the relay 202 is configured to connect the first communication network to the processor 103 through the first communication network interface 101 and the first Ethernet chip 201 or connect the second communication network to the processor 103 through the second communication network interface 102 and the second Ethernet chip 203.

In practical applications, the first communication network may be set as a 5G network, and the second communication network may be set as a fiber optic network. The target device communicates by default through the fiber optic network. If a fiber optic network failure is detected, a network failure signal may be sent to the main message flow of the communication network switching apparatus, and then a control signal is sent through the processor 103 to control the relay 202 to connect the 5G network to the processor 103 through the first communication network interface 101 and the first Ethernet chip 201 to achieve network switching.

The advantage of this setting is as follows: Since the relay is a switch that selects the first communication network interface or the second communication network interface in a single way, only one network can access the processor at the same time, thereby achieving real physical isolation of the first communication network and the second communication network.

The technical solution of this embodiment provides a communication network switching apparatus, a communication network switching system, and a communication network switching method. The apparatus includes a first communication network interface, a second communication network interface, a processor, a communication network switch, and a device access interface. The first communication network interface is connected to a first communication network. The second communication network interface is connected to a second communication network. The first communication network interface and the second communication network interface are separately connected to the processor through the communication network switch. The communication network switch is configured to switch, according to the control signal of the processor, the connection manner with the first communication network interface and the second communication network interface and connect the first communication network or the second communication network to the processor. The processor is connected to the device access interface and is configured to connect a target communication network connected through the communication network switch to a target device connected to the device access interface. In this manner, the problem of poor reliability of target device communication caused by communication through a single communication network is solved, and the reliability of target device communication is improved. Secondly, by disposing a communication network switch between the first communication network interface and the second communication network interface, different communication networks can be completely physically isolated, interference and conflict between different networks can be avoided, and the stability and security of communication can be improved. Finally, the connection manner with the first communication network interface and the second communication network interface is switched by the control signal of the processor, which reduces the cost of switching the communication network.

EMBODIMENT TWO

Figure 3:
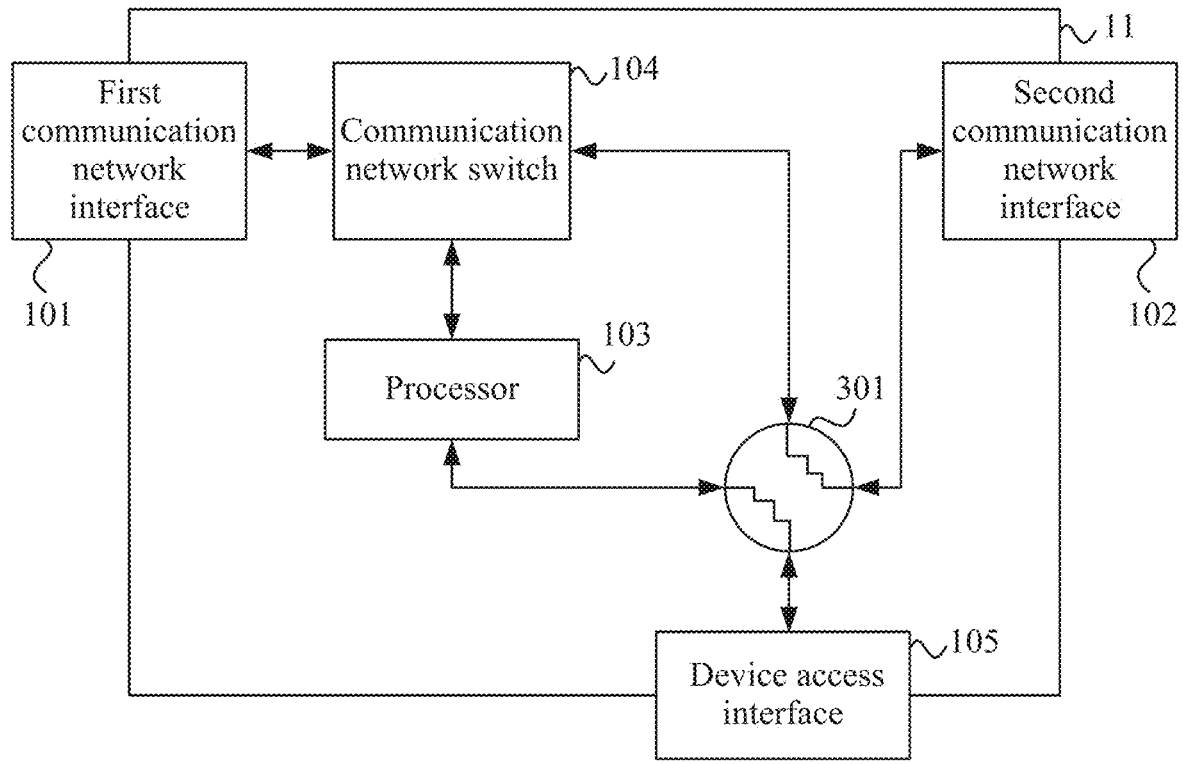
FIG. 3 is a diagram illustrating the structure of another communication network switching apparatus according to embodiment two of the present disclosure.

FIG. 3 is a diagram illustrating the structure of another communication network switching apparatus according to embodiment two of the present disclosure. This embodiment is a further optimization and extension based on the preceding embodiments and may be combined with various optional technical solutions in the preceding embodiments.

As shown in FIG. 3, the communication network switching apparatus 11 disclosed in this embodiment includes a first communication network interface 101, a second communication network interface 102, a processor 103, a communication network switch 104, a device access interface 105, and a network isolator 301.

In the figure, a first end of the network isolator 301 is connected to the device access interface 105; a second end of the network isolator 301 is connected to the first communication network interface 101 or the second communication network interface 102.

In a specific embodiment, as shown in FIG. 3, the first end of the network isolator 301 may connected to the device access interface 105; the second end of the network isolator 301 may be connected to the first communication network interface 101 or the second communication network interface 102; the connection end of the communication network switch 104 and the first communication network interface 101 is used as a first connection end, and the connection end of the communication network switch 104 and the second communication network interface 102 is used as a second connection end; correspondingly, according to a communication network interface connected to the network isolator 301, a third end of the network isolator 301 is connected to the first connection end or the second connection end; a fourth end of the network isolator 301 is connected to the processor 103.

The advantage of this setting is as follows: By the configuration of a network isolator, it is possible to prevent the unselected communication network from receiving the control signal of the processor, thereby improving the security of network communication.

In this embodiment, the network isolator 301 is configured to, in a case where it is determined that the processor 103 is connected to the first communication network or the second communication network, set a communicatively connected state between the first end of the network isolator 301 and the fourth end of the network isolator 301 and between the second end of the network isolator 301 and the third end of the network isolator 301.

Figure 4:
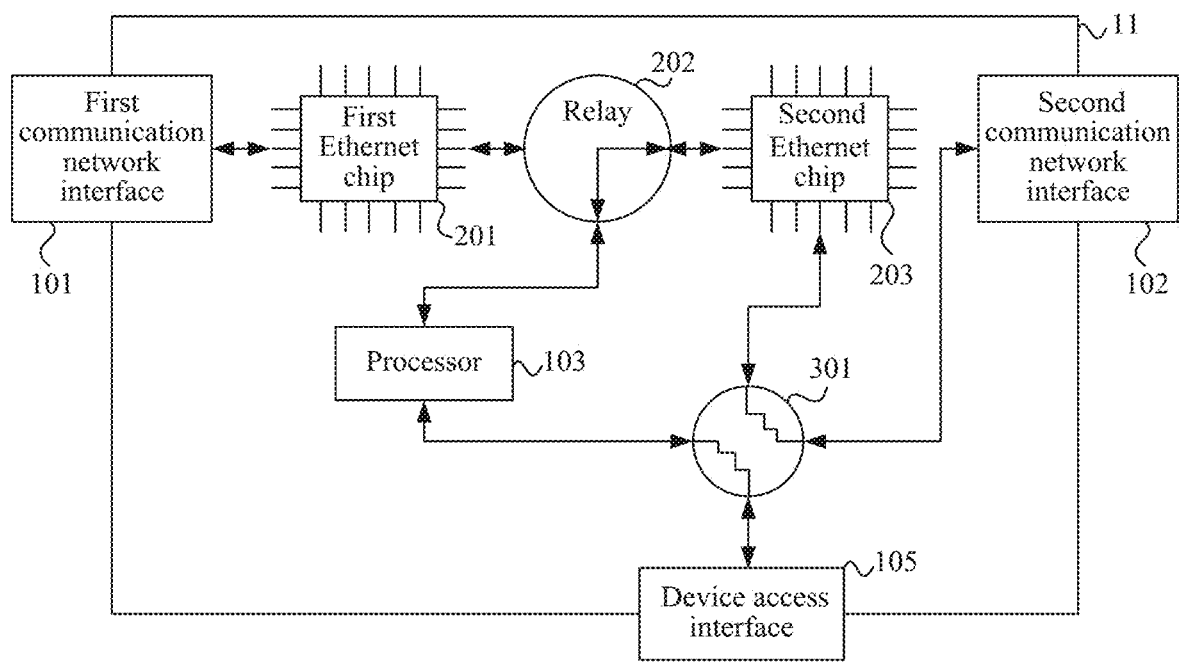
FIG. 4 is a diagram illustrating the working scene of a communication network switching apparatus according to embodiment two of the present disclosure.

FIG. 4 is a diagram illustrating the working scene of a communication network switching apparatus according to embodiment two of the present disclosure. Illustratively, as shown in FIG. 4, the communication network switch includes a first Ethernet chip 201, a second Ethernet chip 203, and a relay 202. In the case where the communication network switching apparatus 11 works normally, the first end of the network isolator 301 may be connected to the device access interface 105, the second end of the network isolator 301 may be connected to the second communication network interface 102, and the third end of the network isolator 301 may be connected to the second Ethernet chip 203. The fourth end of the network isolator 301 is connected to the processor 103 to send a control signal to the relay 202. By the control signal, the second end of the relay 202 is controlled to be connected to the second communication network interface 102 through the second Ethernet chip 203 to achieve network communication.

The advantage of this setting is as follows: By setting a communicatively connected state between the first end of the network isolator and the fourth end of the network isolator and between the second end of the network isolator and the third end of the network isolator, the second communication network can be connected to the target device. In addition, the network isolator achieves the physical isolation between the second communication network and the processor and improves the security of network communication.

Figure 5:
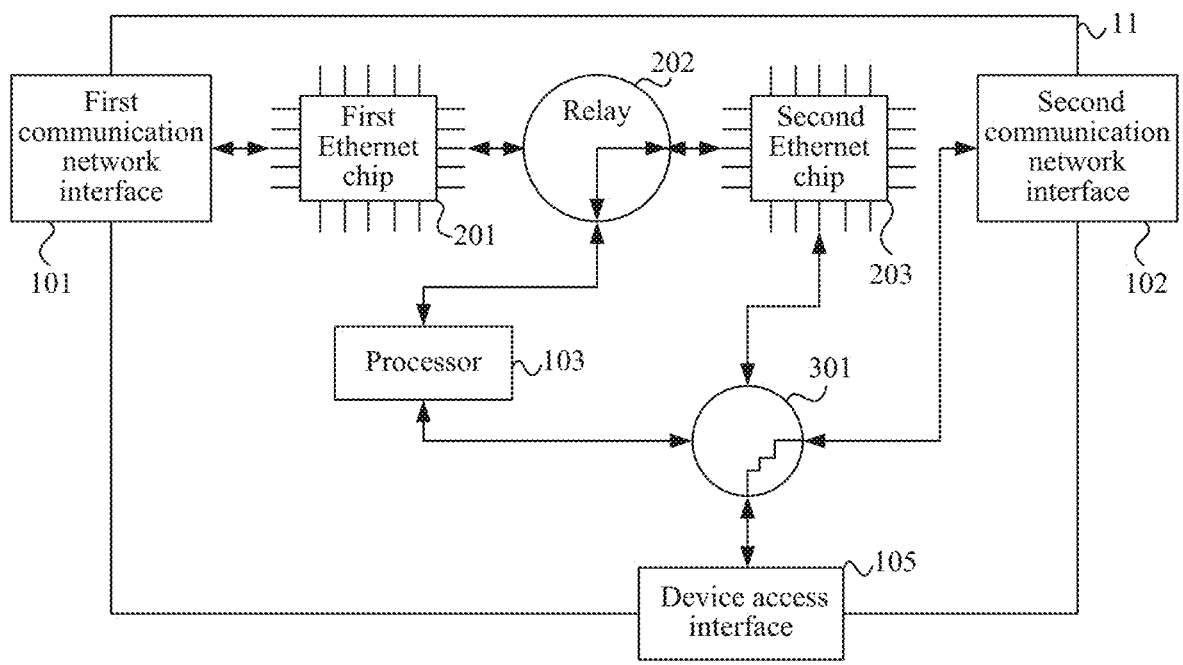
FIG. 5 is a diagram illustrating another working scene of the communication network switching apparatus according to embodiment two of the present disclosure.

FIG. 5 is a diagram illustrating another working scene of the communication network switching apparatus according to embodiment two of the present disclosure.

In an optional embodiment of the present disclosure, as shown in FIG. 5, the network isolator 301 is also configured to, in a case where it is determined that the processor 103 is not connected to a communication network, set a communicatively connected state between the first end of the network isolator 301 and the second end of the network isolator 301.

Illustratively, if the communication network switching apparatus 11 fails or loses power, the processor 103 cannot access a communication network. In this case, a bypass of the communication network switching apparatus 11 may be triggered to connect to a backup network, that is, by setting a communicatively connected state between the first end of the network isolator 301 and the second end of the network isolator 301, the second communication network is automatically connected to the target device.

The advantage of this setting is as follow: By setting a communicatively connected state between the first end of the network isolator and the second end of the network isolator, the communication remains normal in a case where the communication network switching apparatus is powered off or fails, thereby improving the stability and reliability of the communication.

Optionally, the processor 103 is configured to generate a control signal for communication network switching in a case where it is detected that port traffic information of a target communication network interface corresponding to an accessed target communication network meets a preset traffic monitoring condition.

In this embodiment, the port traffic information may include inbound and outbound traffic of the target communication network interface. The target communication network interface may be the first communication network interface 101 or the second communication network interface 102. The preset traffic monitoring condition may be a condition for triggering a network port switching operation. The preset traffic monitoring condition may be less than a minimum preset traffic value or greater than a maximum preset traffic value. The minimum preset traffic value and the maximum preset traffic value may be set according to user needs and/or the operating state of the target device.

Illustratively, the processor 103 may be used to detect port traffic information of the second communication network interface. If the detection result reflects that the port traffic information meets the preset traffic monitoring condition, a disconnected state may be set between the second end of the network isolator 301 and the third end of the network isolator 301. The processor 103 sends a control signal to control the first end of the relay 202 to connect to the first communication network interface 101 to achieve network switching.

Optionally, in a case where it is detected that the target communication network interface has no traffic value, automatic switch to another communication network may be performed. For example, the target communication network interface may be set to the first communication network interface 101. If it is detected that the traffic value corresponding to the first communication network interface 101 is 0, the second communication network may be automatically connected to the processor 103.

Optionally, the network isolator 301 includes a photovoltaic isolation relay.

The advantage of this setting is as follows: A photovoltaic isolation relay is adopted to separate the first communication network and the second communication network from the processor in a hardware manner so that the influence of the control signal of the processor on the communication networks can be further avoided, the interference between different networks is reduced, and the stability of communication is improved.

The technical solution of this embodiment provides a communication network switching apparatus, a communication network switching system, and a communication network switching method. The apparatus includes a first communication network interface, a second communication network interface, a processor, a first Ethernet chip, a relay, a second Ethernet chip, a device access interface, and a network isolator. A first end of the network isolator is connected to the device access interface. A second end of the network isolator is connected to the first communication network interface or the second communication network interface. The network isolator is configured to, in a case where it is determined that the processor is connected to the first communication network or the second communication network, set a disconnected state between the first end of the network isolator and the second end of the network isolator. In this manner, the problem of poor reliability of target device communication caused by communication through a single communication network is solved, and the reliability of target device communication is improved. Secondly, the technical solution of this embodiment adopts a method of double physical isolation so that a relay and/or a network isolator can be used to perform physical isolation between the first communication network and the second communication network and between the first communication network and the second communication network and the processor, thereby improving the confidentiality, security, integrity, non-repudiation, and availability of the networks.

EMBODIMENT THREE

Figure 6:
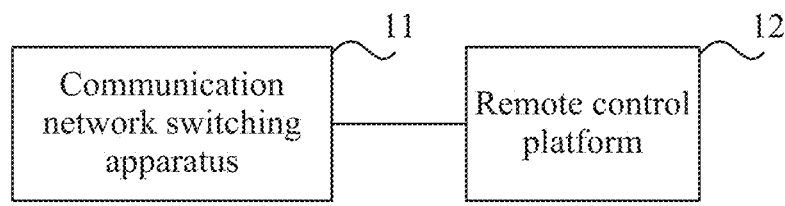
FIG. 6 is a diagram illustrating the structure of a communication network switching system according to embodiment three of the present disclosure.

FIG. 6 is a diagram illustrating the structure of a communication network switching system according to embodiment three of the present disclosure. This embodiment is a further optimization and extension based on the preceding embodiments and may be combined with various optional technical solutions in the preceding embodiments.

As shown in FIG. 6, the communication network switching system disclosed in this embodiment includes the communication network switching apparatus 11 and a remote control platform 12.

The remote control platform 12 is configured to remotely acquire usage information of a processor for display of the usage information, perform fault detection according to the usage information, and issue a fault alarm according to the fault detection result.

In this embodiment, the usage information may include CPU usage, memory usage, temperature, port traffic information, and other information. The fault detection result may include the following: The communication network switching apparatus 11 fails, the communication network switching apparatus 11 is normal, the communication network switching apparatus 11 is powered off, the first communication network and/or the second communication network are redundant, and the first communication network and/or the second communication network fail.

In a specific embodiment, the functions of the remote control platform 12 may include remote management of the master station and remote fault alarm of the terminal. In practical applications, administrators may remotely access the usage information (for example, CPU usage, memory usage, temperature, port traffic information, operation reports, and logs) of the communication network switching apparatus 11 through the remote control platform 12 and trigger operations such as remote management of the hardware of the communication network switching apparatus 11 and remote switching of the communication interface according to the preceding usage information. In addition, administrators may also view the alarm information of the communication network switching apparatus 11 in real time through the remote control platform 12 and remotely manually switch the communication channel according to the alarm information. The preceding alarm information may include information such as the communication state and switching failure of the communication network switching apparatus 11.

Optionally, the remote control platform 12 is also configured to perform remote service management on the communication network switching apparatus 11. The remote service management includes a remote online upgrade operation and a remote restarting operation.

In practical applications, administrators may acquire, by the remote control platform 12, version information of software and hardware that are configured by the communication network switching apparatus 11 and then trigger an online upgrade operation according to the version information. In addition, administrators may also remotely restart the communication network switching apparatus 11 according to the log and report information of the communication network switching apparatus 11.

The advantage of this setting is as follows: By the configuration of a remote control platform, the remote control of the communication network switching apparatus can be achieved. Thus, the cost of controlling the communication network switching apparatus is reduced, the management and operation process are simplified, and the efficiency and reliability of network operation and maintenance are improved.

Optionally, after the communication network switching apparatus 11 is integrated with the remote control platform 12, the communication network switching apparatus 11 may provide a visual monitoring and reporting function to display the real-time state and trend of network security events (That is, the communication network switching apparatus 11 may collect usage information of the apparatus 11 and the network security events the apparatus 11 faces in real time and then analyzes the usage information and the network security events to obtain the real-time state and trend of the network security events. After that, the communication network switching apparatus 11 may display the preceding real-time state and the trend by the visual interface.) In this manner, administrators can better understand and analyze network security conditions and make timely decisions and improvements. Secondly, after being integrated with the remote control platform 12, the communication network switching apparatus 11 may provide more advanced configuration options and policy settings, and administrators may formulate, according to the results of security monitoring, more sophisticated switching strategies and optimize network traffic and resource allocation to improve network security and performance.

On the basis of the preceding embodiments, the communication network switching system may control the communication network switching apparatus by the mutual cooperation of hardware and software.

Figure 7:
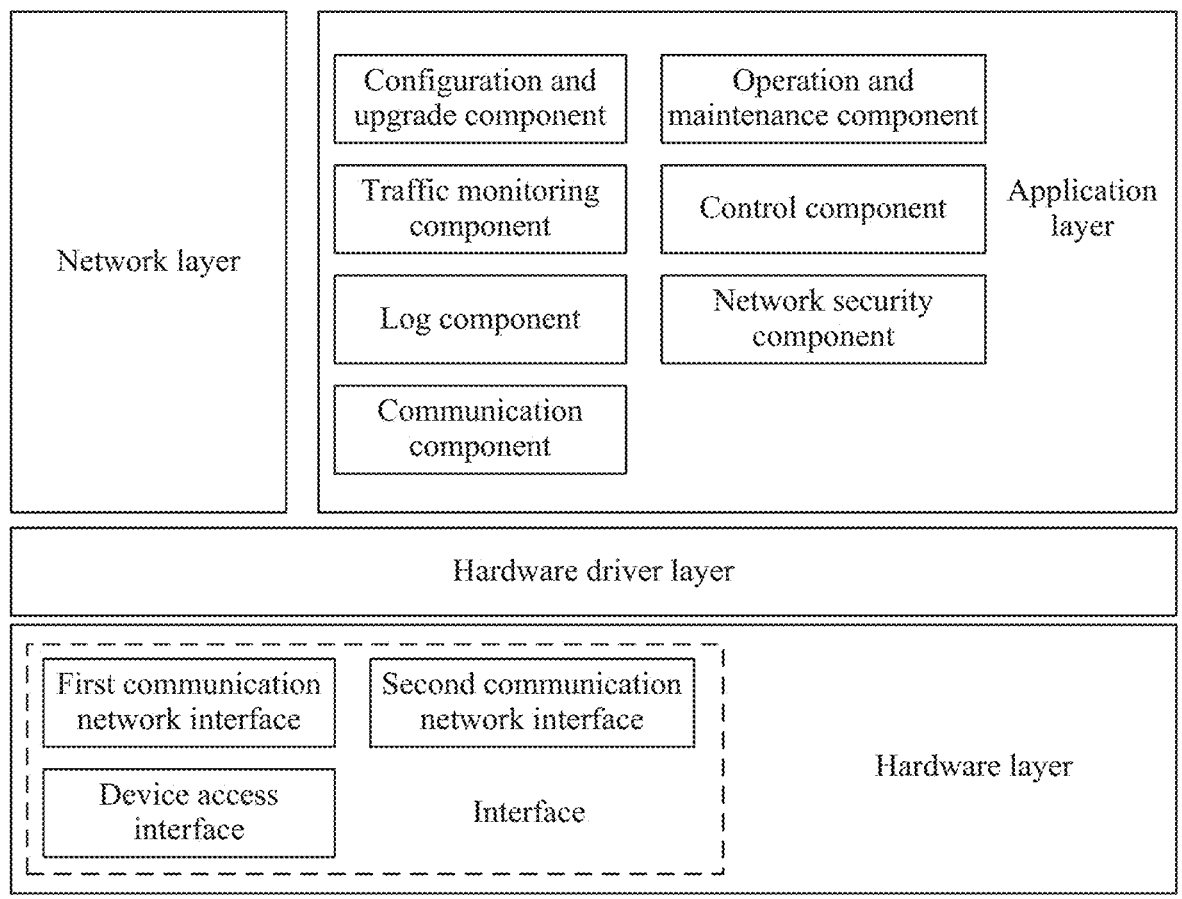
FIG. 7 is a structural diagram illustrating the hardware architecture of a communication network switching apparatus according to embodiments of the present disclosure.

FIG. 7 is a structural diagram illustrating the hardware architecture of a communication network switching apparatus according to embodiments of the present disclosure. As shown in FIG. 7, the communication network switching apparatus 11 includes a network layer, an application layer, a hardware driver layer, and a hardware layer. The application layer includes a configuration and upgrade component, a traffic monitoring component, a log component, a communication component, an operation and maintenance component, a control component, a network security component, a network port physical isolation component of the hardware layer, and a communication control component of the network layer. The hardware layer includes a first communication network interface, a second communication network interface, and a device access interface.

The configuration and upgrade component is configured to implement parameter configuration and embedded software upgrades of the Internet Protocol (IP) address, gateway, mask, network security, network address translation (NAT), bridge, etc. of the communication interfaces. The traffic control component is used for bypass connection, communication interface traffic monitoring, and real-time network switching. The log component is configured to record software operations and running logs. The communication component may be configured as a backup communication interface to be used as the emergency debugging interface of the communication network switching apparatus in a case where all communications are interrupted. The operation and maintenance component may be configured to monitor the state of the target device and the communication network switching apparatus and control the management operation for sending. The control component may be configured to control the switching of the communication networks. The network security component is used for Distributed Denial of Service (DDoS) alarms, malicious port access detection, and whitelist restrictions. The network port physical isolation component may be used as an isolation circuit for an independent Ethernet chip to achieve physical isolation of the communication interfaces. The communication control component is configured to control the entire communication network switching apparatus.

Figure 8:
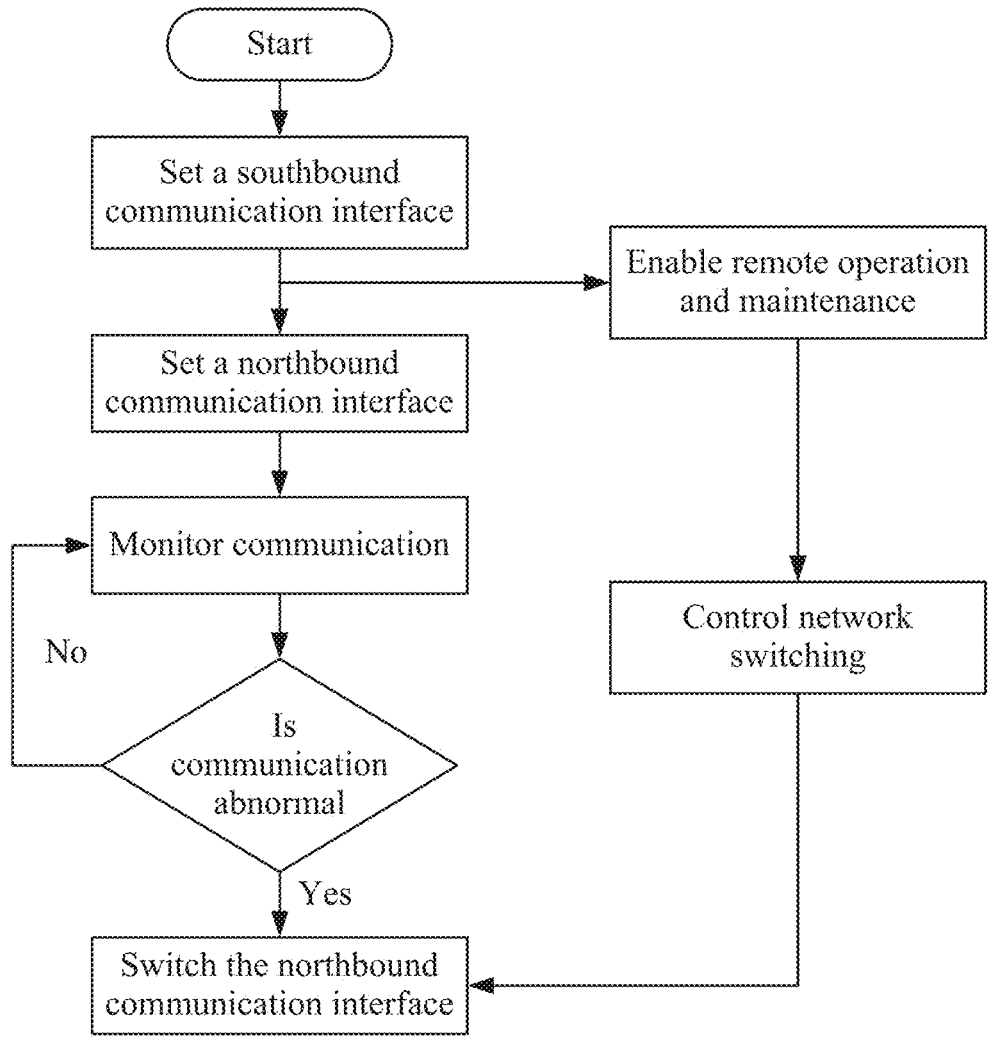
FIG. 8 is a flowchart of a software control method for a communication network switching apparatus according to an embodiment of the present disclosure.

FIG. 8 is a flowchart of a software control method for a communication network switching apparatus according to an embodiment of the present disclosure. As shown in FIG. 8, after the communication network switching system is started, the southbound communication interface (that is, the device access interface) for accessing the target device may be first set through the remote control platform. Then, the operation and maintenance functions of the communication network switching apparatus and the remote control platform are enabled, and the northbound communication interface is reset through the remote control platform. The northbound communication interface may include the first communication network interface and the second communication network interface. After the operation and maintenance function of the remote control platform is enabled, the remote control platform may receive various types of information reported by the communication network switching apparatus and receive control information. Administrators may manually and remotely control, as required, the northbound communication interface (including the first communication network interface and the second communication network interface) of the communication network switching apparatus. After the interfaces and parameters are set, the communication monitoring function of the communication network switching apparatus may be started to determine the states of the northbound communication interface (including the first communication network interface and the second communication network interface) and the southbound communication interface (that is, the device access interface) of the communication network switching apparatus in real time. If the current communication is abnormal, the northbound communication interface may be controlled to switch automatically (for example, switch from the first communication network interface to the second communication network interface), and a new round of communication state monitoring is entered. If the current communication is normal, the system may return to perform communication monitoring.

The technical solutions of this embodiment provide a communication network switching apparatus, a communication network switching system, and a communication network switching method. The system includes a communication network switching apparatus and a remote control platform. The remote control platform is configured to remotely acquire usage information of a processor for display of the usage information, perform fault detection according to the usage information, and issue a fault alarm according to the fault detection result. In this manner, the problem is solved where the related art only provides a basic management interface (for example, a command line interface or a simple network interface), resulting in the need for manual switching of communication interfaces. Moreover, remote control of the communication network switching apparatus can be achieved, the process of management and operation is simplified, and the efficiency and reliability of network operation and maintenance are improved.

Figure 9:
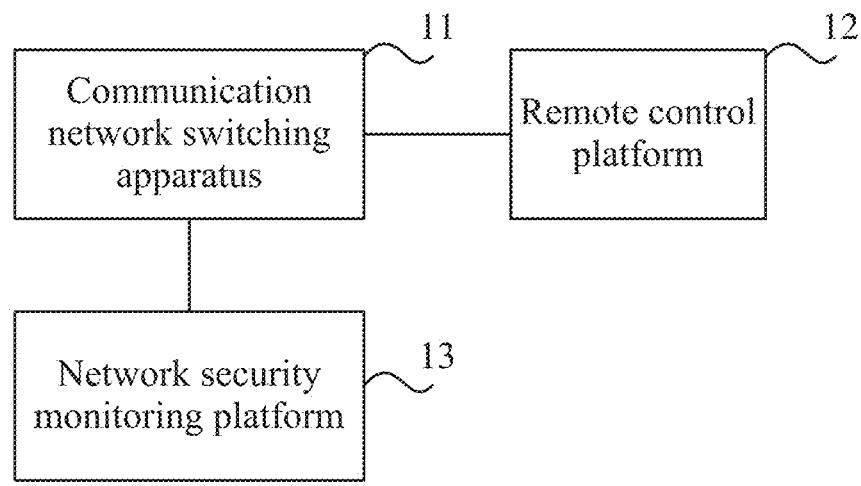
FIG. 9 is a diagram illustrating the structure of another communication network switching system according to embodiment three of the present disclosure.

FIG. 9 is a diagram illustrating the structure of another communication network switching system according to embodiment three of the present disclosure. As shown in FIG. 9, the system also includes a network security monitoring platform 13.

The network security monitoring platform 13 is configured to perform security monitoring on the first communication network interface, the second communication network interface, and the device access interface of the communication network switching apparatus 11 and, according to the security monitoring result, control the access state of each interface.

In this embodiment, after the communication network switching apparatus 11 determines the communication network, the network security monitoring platform 13 performs security monitoring on the first communication network interface, the second communication network interface, and the device access interface. Optionally, the security monitoring method may include anti-malicious port access, anti-DDOS attack, and configuration of a whitelist. In an embodiment, the implementation of the anti-malicious port access function may be as follows: The communication network switching apparatus 11 takes security measures such as using a cutting system and disabling unnecessary services and ports, closing the secure shell (SSH) service, using strong passwords and authentication measures, and limiting remote access, so as to strengthen the embedded system.

The DDOS attack may be that one or more attackers attack one or more targets at the same time. The services requested by these data packets often consume a large amount of system resources, causing the target host to be unable to provide normal services to users and even causing the system to crash. Since the hardware resources of the technical solution of this embodiment are sufficient, the processing capacity of the system is greatly improved. Therefore, the anti-DDOS attack function may be implemented by configuring rules in the communication network switching apparatus 11 to achieve filtering and blocking DDOS attacking traffic, limiting frequent connection requests, limiting access to specific IP addresses or IP ranges, and other operations. The whitelist may be used to protect system and network resources from unauthorized access, and by limiting access to specific entities, the whitelist can help reduce the risk of security issues such as network attacks and data leaks.

Optionally, by the integration of the network security monitoring platform 13 with the communication network switching apparatus 11, automatic coping and response of the system can be achieved. In an embodiment, in a case where a security threat is detected, the communication network switching apparatus 11 may automatically trigger corresponding operations (for example, switching to a backup network and isolating infected devices) to mitigate potential security threats. Second, the communication network switching apparatus 11 may monitor the connection state of the communication network and automatically switch the communication traffic to the backup network in a case where a communication network failure occurs. This automatic switch can reduce the dependence on operators and improve the reliability and availability of the system. In an embodiment, the communication network may be the second communication network, and the backup network may be the first communication network.

Optionally, the network security monitoring platform 13 is also configured to remotely monitor the network state, network configuration, and software configuration.

The advantage of this setting is as follows: By the integration of the network security monitoring platform with the communication network switching apparatus, real-time monitoring and analysis of the network traffic, communication network switching apparatus, target device, and communication network switching system can be achieved, so as to timely detect and deal with potential security threats (such as malware, intrusion attempts, and abnormal behavior). Thus, the security and defense capabilities of the network are improved.

EMBODIMENT FOUR

Figure 10:
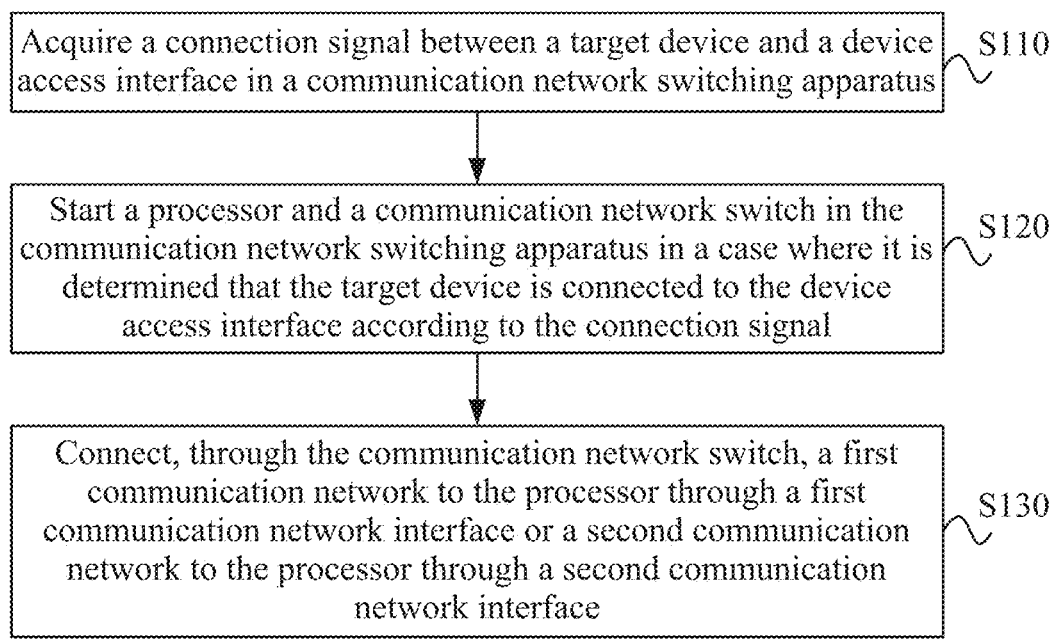
FIG. 10 is a flowchart of a communication network switching method according to embodiment four of the present disclosure.

FIG. 10 is a flowchart of a communication network switching method according to embodiment four of the present disclosure. This embodiment is a further optimization and extension based on the preceding embodiments and may be combined with various optional technical solutions in the preceding embodiments.

As shown in FIG. 10, the communication network switching method disclosed in this embodiment is applied to the communication network switching system. The method includes the following:

In S110, a connection signal between a target device and a device access interface in a communication network switching apparatus is acquired.

In a specific embodiment, in the communication network switching system, the connection signal between the target device and the communication network switching apparatus may be acquired through the remote control platform. Then, according to the connection signal, the operation of connecting the target device to the device access interface is performed.

In S120, a processor and a communication network switch in the communication network switching apparatus are started in a case where it is determined that the target device is connected to the device access interface according to the connection signal.

In S130, the communication network switch connects a first communication network to the processor through a first communication network interface or a second communication network to the processor through a second communication network interface.

In a specific embodiment, in the communication network switching system, the communication network connected to the processor may be remotely determined through the remote control platform.

In an optional embodiment of the present disclosure, the method also includes the following: A control signal for communication network switching is generated in a case where it is detected, through the processor, that port traffic information of a target communication network interface corresponding to an accessed target communication network meets a preset traffic monitoring condition. By the communication network switch and according to the control signal, the connection manner with the first communication network interface and the second communication network interface is switched, and the first communication network or the second communication network is connected to the processor. By a network isolator, a disconnected state is set between a first end of the network isolator and a second end of the network isolator in a case where it is determined, by the target device, that the processor is connected to the first communication network or the second communication network. By the network isolator, a communicatively connected state is set between the first end of the network isolator and the second end of the network isolator in a case where it is determined, by the target device, that the processor is not connected to a communication network.

Illustratively, assuming that the communication network currently connected to the target device is the first communication network, the port traffic information of the first communication network interface may be detected by the processor. If the detection result reflects that the port traffic information meets a preset traffic monitoring condition, the processor may send a control signal to control the second end of the relay to connect to the second communication network interface so as to switch to the second communication network interface. At this time, the first end of the network isolator and the second end of the network isolator are in a disconnected state, and the second end of the network isolator and the third end of the network isolator are in a communicatively connected state. Alternatively, if the communication network switching apparatus is powered off or fails, a communicatively connected state may be set between the first end of the network isolator and the second end of the network isolator.

In the technical solution of this embodiment, a connection signal between a target device and a device access interface in a communication network switching apparatus is acquired; a processor and a communication network switch in the communication network switching apparatus are started in a case where it is determined that the target device is connected to the device access interface according to the connection signal; the communication network switch connects a first communication network to the processor through a first communication network interface or a second communication network to the processor through a second communication network interface. By this technical means, the problem of poor reliability of target device communication caused by communication through a single communication network is solved, the reliability of target device communication is improved, and the cost of switching the communication network is reduced. Secondly, by the configuration of a communication network switch between the first communication network interface and the second communication network interface, network switching can be achieved through the communication network switch, interference and conflict between different networks can be avoided, and the stability and security of communication can be improved.

It is to be understood that various forms of processes shown above may be adopted with steps reordered, added, or deleted. For example, the steps described in the present disclosure may be performed in parallel, sequentially, or in different orders, as long as the desired results of the technical solutions of the present disclosure can be achieved, and no limitation is imposed herein.

The preceding embodiments do not limit the scope of the present disclosure. It is to be understood by those skilled in the art that various modifications, combinations, sub-combinations, and substitutions may be performed according to design requirements and other factors. Any modifications, equivalent substitutions, improvements, and the like made within the spirit and principle of the present disclosure are within the scope of the present disclosure.

What is claimed is:

1. A communication network switching apparatus, comprising a first communication network interface, a second communication network interface, a processor, a communication network switch, and a device access interface, wherein
the first communication network interface is connected to a first communication network, the second communication network interface is connected to a second communication network, and the first communication network interface and the second communication network interface are separately connected to the processor through the communication network switch;
the communication network switch is configured to switch, according to a control signal of the processor, a connection manner with the first communication network interface and the second communication network interface and connect the first communication network or the second communication network to the processor; and
the processor is connected to the device access interface and is configured to connect a target communication network connected through the communication network switch to a target device connected to the device access interface;
the apparatus further comprises a network isolator, wherein
a first end of the network isolator is connected to the device access interface; a second end of the network isolator is connected to the first communication network interface or the second communication network interface; and a connection end of the communication network switch and the first communication network interface is used as a first connection end, and a connection end of the communication network switch and the second communication network interface is used as a second connection end;
correspondingly, a third end of the network isolator is connected to the first connection end or the second connection end according to a communication network interface connected to the network isolator, and a fourth end of the network isolator is connected to the processor;
the network isolator is configured to, in a case where it is determined that the processor is connected to the first communication network or the second communication network, set a communicatively connected state between the first end of the network isolator and the fourth end of the network isolator and between the second end of the network isolator and the third end of the network isolator; and
the network isolator is further configured to, in a case where it is determined that the processor is not connected to a communication network, set the communicatively connected state between the first end of the network isolator and the second end of the network isolator.

2. The apparatus of claim 1, wherein the network isolator comprises a photovoltaic isolation relay.

3. The apparatus of claim 2, wherein the processor is configured to:
generate a control signal for switching the communication network in a case where it is detected that port traffic information of a target communication network interface corresponding to an accessed target communication network meets a preset traffic monitoring condition.

4. The apparatus of claim 1, wherein the communication network switch comprises a first Ethernet chip, a second Ethernet chip, and a relay; wherein
a first end of the relay is connected to the first communication network interface through the first Ethernet chip; a second end of the relay is connected to the second communication network interface through the second Ethernet chip; and a third end of the relay is connected to the processor; and
the relay is configured to switch a connection manner with the first Ethernet chip and the second Ethernet chip according to the control signal of the processor; and the relay is configured to connect the first communication network to the processor through the first communication network interface and the first Ethernet chip or connect the second communication network to the processor through the second communication network interface and the second Ethernet chip.

5. The apparatus of claim 4, wherein the processor is configured to:
generate a control signal for switching the communication network in a case where it is detected that port traffic information of a target communication network interface corresponding to an accessed target communication network meets a preset traffic monitoring condition.

6. The apparatus of claim 1, wherein the processor is configured to:
generate a control signal for switching the communication network in a case where it is detected that port traffic information of a target communication network interface corresponding to an accessed target communication network meets a preset traffic monitoring condition.

7. A communication network switching system, comprising the communication network switching apparatus of claim 1 and a remote control platform; wherein
the remote control platform is configured to remotely acquire usage information of a processor for display of the usage information, perform fault detection according to the usage information and issue a fault alarm according to a fault detection result.

8. The system of claim 7, wherein the remote control platform is further configured to:
perform remote service management on the communication network switching apparatus, wherein the remote service management comprises a remote online upgrade operation and a remote restarting operation.

9. The system of claim 7, further comprising a network security monitoring platform;
wherein the network security monitoring platform is configured to perform security monitoring on the first communication network interface, the second communication network interface, and the device access interface of the communication network switching apparatus and, according to a security monitoring result, control an access state of each interface of the first communication network interface, the second communication network interface, and the device access interface.

10. The system of claim 7, wherein the network isolator comprises a photovoltaic isolation relay.

11. The system of claim 10, wherein the processor is configured to:
generate a control signal for switching the communication network in a case where it is detected that port traffic information of a target communication network interface corresponding to an accessed target communication network meets a preset traffic monitoring condition.

12. The system of claim 7, wherein the communication network switch comprises a first Ethernet chip, a second Ethernet chip, and a relay; wherein
a first end of the relay is connected to the first communication network interface through the first Ethernet chip; a second end of the relay is connected to the second communication network interface through the second Ethernet chip; and a third end of the relay is connected to the processor; and
the relay is configured to switch a connection manner with the first Ethernet chip and the second Ethernet chip according to the control signal of the processor; and the relay is configured to connect the first communication network to the processor through the first communication network interface and the first Ethernet chip or connect the second communication network to the processor through the second communication network interface and the second Ethernet chip.

13. The system of claim 12, wherein the processor is configured to:
generate a control signal for switching the communication network in a case where it is detected that port traffic information of a target communication network interface corresponding to an accessed target communication network meets a preset traffic monitoring condition.

14. The system of claim 7, wherein the processor is configured to:
generate a control signal for switching the communication network in a case where it is detected that port traffic information of a target communication network interface corresponding to an accessed target communication network meets a preset traffic monitoring condition.

15. A communication network switching method, the method being applied to a communication network switching system, wherein the system comprises a communication network switching apparatus and a remote control platform; wherein the communication network switching apparatus comprises a first communication network interface, a second communication network interface, a processor, a communication network switch, and a device access interface, wherein the first communication network interface is connected to a first communication network, the second communication network interface is connected to a second communication network, and the first communication network interface and the second communication network interface are separately connected to the processor through the communication network switch; the communication network switch is configured to switch, according to a control signal of the processor, a connection manner with the first communication network interface and the second communication network interface and connect the first communication network or the second communication network to the processor; and the processor is connected to the device access interface and is configured to connect a target communication network connected through the communication network switch to a target device connected to the device access interface; the apparatus further comprises a network isolator, wherein a first end of the network isolator is connected to the device access interface; a second end of the network isolator is connected to the first communication network interface or the second communication network interface; and a connection end of the communication network switch and the first communication network interface is used as a first connection end, and a connection end of the communication network switch and the second communication network interface is used as a second connection end; correspondingly, a third end of the network isolator is connected to the first connection end or the second connection end according to a communication network interface connected to the network isolator, and a fourth end of the network isolator is connected to the processor; the network isolator is configured to, in a case where it is determined that the processor is connected to the first communication network or the second communication network, set a communicatively connected state between the first end of the network isolator and the fourth end of the network isolator and between the second end of the network isolator and the third end of the network isolator; and the network isolator is further configured to, in a case where it is determined that the processor is not connected to a communication network, set the communicatively connected state between the first end of the network isolator and the second end of the network isolator; wherein the remote control platform is configured to remotely acquire usage information of a processor for display of the usage information, perform fault detection according to the usage information and issue a fault alarm according to a fault detection result; the method comprising:

acquiring a connection signal between a target device and a device access interface in the communication network switching apparatus;

starting the processor and the communication network switch in the communication network switching apparatus in a case where it is determined that the target device is connected to the device access interface according to the connection signal; and connecting, by the communication network switch, the first communication network to the processor through the first communication network interface or the second communication network to the processor through the second communication network interface.

16. The method of claim 15, further comprising:

generating a control signal for communication network switching in a case where it is detected, through the processor, that port traffic information of a target communication network interface corresponding to an accessed target communication network meets a preset traffic monitoring condition;

switching, through the communication network switch and according to the control signal, a connection manner with the first communication network interface and the second communication network interface to connect the first communication network or the second communication network to the processor;

setting, by the network isolator, a disconnected state between the first end of the network isolator and the second end of the network isolator in a case where it is determined, by the target device, that the processor is connected to the first communication network or the second communication network; and setting, by the network isolator, the communicatively connected state between the first end of the network isolator and the second end of the network isolator in a case where it is determined, by the target device, that the processor is not connected to the communication network.

17. The method of claim 15, wherein the remote control platform is further configured to:

perform remote service management on the communication network switching apparatus, wherein the remote service management comprises a remote online upgrade operation and a remote restarting operation.

18. The method of claim 15, wherein the system further comprises a network security monitoring platform;

wherein the network security monitoring platform is configured to perform security monitoring on the first communication network interface, the second communication network interface, and the device access interface of the communication network switching apparatus and, according to a security monitoring result, control an access state of each interface of the first communication network interface, the second communication network interface, and the device access interface.

* * * * *